UNITED STATES PATENT OFFICE 2,147,701

CELLULOSIC STRUCTURES AND METHOD FOR PREPARING SAME

Gilman S. Hooper, Waynesboro, Va., assignor to E. I. du Pont de Nemours & Company, Wilmington, Del., a corporation of Delaware No Drawing. Application July 24, 1936, Serial No. 92,391

16 Claims. (Cl. 106—40)

This invention relates to cellulose derivative compositions suitable for use in the production of artificial silk, plastics, wrapping tissue, photographic film, coating compositions, and the like. More particularly, the invention relates to new plasticizers which may be used in conjunction with water for plasticizing cellulose derivative compositions or structures.

The invention will be described with particular reference to cellulose acetate compositions and structures, it being understood, however, that the invention is equally applicable to the preparation of organic cellulose derivatives broadly.

It is therefore an object of the present invention to provide a new plasticizer for cellulose derivative compositions and structures.

It is another object of the present invention to provide a water soluble plasticizer having a comparatively high boiling point for use in the cellulose derivative compositions and structures.

It is a further object of the present invention to provide a new water soluble plasticizer having a comparatively high boiling point for use in cellulose derivative compositions and structures, which plasticizer may be used in the cellulose derivative thread treating composition, and which when applied to cellulose derivative threads will render them particularly suitable for use in textile operations, and which plasticizer may be easily removed after the textile operation.

Other objects of the invention will appear hereinafter.

The objects of the invention may be accomplished, in general, by incorporating in a cellulose derivative composition or treating the cellulose derivative structure with a plasticizer comprising a ketonic acid having the formula:

$$RCO—CR^1R^2CR^3R^4COOH$$

in which R, $R^1$, $R^2$, $R^3$, and $R^4$ represent hydrogen atoms, or alkyl or aralkyl groups which are similar or dissimilar to each other.

As the preferred plasticizers or softeners for plasticizing or softening cellulose derivatives, compounds or structures, in accordance with the principles of the present invention, may be mentioned levulinic acid, mesitonic acid and beta-propio-propionic acid. Other compounds coming within the scope of the present invention which may be very advantageously used as softeners and/or plasticizers may be mentioned beta-butyro propionic acid, alpha-methyl beta-propio-propionic acid, alpha-methyl beta-methyl beta-butyro propionic acid, alpha-butyl beta-methyl valero propionic acid, alpha-dipropyl beta-aceto propionic acid, alpha-benzyl beta-benzyl beta-aceto propionic acid and the like.

The following specific examples are given to more clearly illustrate the invention, it being understood, however, that the invention is not to be limited thereto.

Example I

Levulinic acid ($CH_3CO—CH_2CH_2—COOH$) having a boiling point of approximately 245° C. is added to an acetone spinning solution containing 22% of cellulose acetate in an amount corresponding to 20% of the weight of the finished thread. Preferably the acetone solution contains 5–10% of water so that the levulinic acid will exert the desired solvent action on the cellulose acetate. The solution is spun by a customary dry spinning method to yield threads which retain most of the levulinic acid, and which are, therefore, quite flexible, pliable, and amenable to textile operations. The fabrics produced with said threads lack elasticity and are therefore readily and permanently deformed by stretching or creasing; however, good elasticity may be imparted to the fabrics simply by removal of the levulinic acid with an aqueous bath treatment.

Example II

15%, based on the weight of the finished yarn, of levulinic acid is added and thoroughly distributed throughout an acetone spinning solution containing 25% of cellulose acetate. Threads spun from this solution in a heated evaporative cell are treated with the following thread dressing composition:

| Constituents | Parts by weight |
|---|---|
| Levulinic acid | 15 |
| Glycerin | 25 |
| Sulfonated animal and vegetable oil 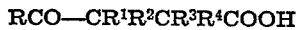 | 25 |
| Triethanolamine | 1 |
| Water | 23 |
| Dextrine | 2 |
| Soap | 1 |

This dressing composition is preferably applied to cellulose acetate threads by passing them over a roller which rotates in the composition in such a fashion and at such a peripheral speed with respect to the linear speed of the thread that the amount of dressing uniformly applied is about 10-30% of the weight of the thread. The resulting thread may be satisfactorily and uniformly knitted into a circular knit fabric having 60 courses per inch without substantial degradation of the yarn.

While acetone has been specified as the volatile solvent of the spinning solution, it will be recognized by those skilled in the art that almost any of the customary volatile solvents of cellulose acetate may be substituted if desired. Thus methyl acetate, dioxane, or mixtures of ethyl alcohol and benzene, ethyl alcohol and acetone, or acetone and water may be employed instead of acetone.

The amount of the ketonic acid to be added to the spinning solution may be varied within wide limits, depending largely upon the degree of flexibility desired for the thread and the plasticizing action of the particular acid chosen. Generally, it has been found that 5% to 35%, or more, based on the weight of the finished yarn, of the ketonic acid gives excellent results. Preferably the cellulose derivative spinning solution will contain 5% to 10% water, based on the weight of the solution.

Instead of introducing the ketonic acid in the spinning solution, the ac'd may, if one wishes, be applied in whole or in part to the finished thread to increase the flexibility thereof. In this latter mode of application, the ketonic acid is preferably diluted, for example, with a hydrocarbon, a polyhydric alcohol or water to a sufficient extent that the threads do not dissolve appreciably or become noticeably tacky.

It will, of course, be recognized by those skilled in the art that the cellulose acetate thread may be treated additionally with other finishing agents regardless of the mode of application of the keton'c acid. As typical examples of customary finishing agents may be mentioned—olive oil, castor oil, cottonseed oil, soya bean oil, peanut oil, teaseed oil, and like animal, vegetable, or mineral oils. The oils may be employed in an oxidized form, if desired. Likewise, water and a hygroscopic relatively non-volatile substance such as ethylene glycol, glycerin, diethylene glycol, propylene glycol, and like polyhydric alcohols or ether derivatives thereof may be applied to cellulose acetate yarn in conjunction with the ketonic acids of the invention.

The invention may be applied with advantageous results to other cellulose esters such as cellulose propionate, cellulose acetopropionate, cellulose acetostearate; and cellulose ethers such as ethyl cellulose, methyl cellulose, butyl cellulose, and benzyl cellulose, in those cases wherein the relatively high-boiling water-soluble acids are swelling agents for that particular organic derivative of cellulose.

While the ketonic acids of the invention are especially valuable in modifying the flexibility of cellulose acetate thread, they may also be applied to advantage in other arts, such as plastics, wrapping tissue, photographic film, coatings, and the like. Thus cellulose acetate sheets and films modified with the ketonic acids of the invention exhibit a greatly improved flexibility which is substantially permanent due to the relatively low volatility of these acids. Such plasticized sheets and films find valuable application as an interlayer in the manufacture of laminated glass. In plastics, cellulose acetate compositions containing these acids may be used in the preparation of toiletware, novelties, rods, tubes, etc.

In coating compositions and the like, the modified cellulose acetate compositions of the invention may be mixed with other materials such as damar, ester gum, polyhydric alcohol-polybasic acid resin, polyvinyl acetate resin, polymerized methyl methacrylate resin, phenol-aldehyde resin, and like natural or synthetic resins, as well as pigments, powdered metals, rubber, and fillers.

The advantages of the invention are numerous. In the first place, the ketonic acids are all solvents or plasticizing agents for cellulose acetate in the presence of water so that they may be incorporated therein to give compatible compositions which find a great variety of valuable applications. Thus, in the thread art, the fact that the ketonic acids have a relatively elevated boiling point insures that the quantity of the ketonic acid in the thread and consequently the capacity of the thread to be bent rapidly and sharply is substantially predetermined and equivalent to the amount of the acid added to the sp'nning solution. This advantage is of considerable importance since in the production of closely knit fabrics the thread is drawn around small turns and sharp corners at a fast rate and the lack of pliability of unmodified cellulose acetate thread has given rise to objectionable distortions and irregularities in the stitch formation and cutting or breaking of the filaments of the thread, as well as defects known in the art as "pin-holes" and "bird-eyes". Unmodified cellulose acetate threads taken from knitted fabrics both before and after finishing have exhibited severely degraded tenacity and elongation characteristics, and stress-strain curves of threads removed from unfinished fabric which is kn't from cellulose acetate thread at 55 courses per inch have shown very material yarn degradation. Furthermore, this yarn degradation becomes rapidly more pronounced when the unmodified cellulose acetate yarn is subjected to knitting at a high stitch count. The essential non-volatility and the stability of the ketonic acids of the invention, together with the fact that in the preferred embodiment they are mostly held within the interstices of the thread, assure that the modified threads may be stored for a long period of time without losing their enhanced flexibility and pliability. Finally, the acids are readily removable since they may be extracted easily with a water bath to give the finished fabric a highly desirable elasticity and resistance to deformation.

It will be obvious that many changes and modifications can be made in the above described method and composition without departing from the nature and spirit of the invention, and it is therefore to be understood that the invention is not to be limited except as set forth in the appended claims.

I claim:

1. A composition composed of a cellulose derivative of an organic acid, said composition containing, as a plasticizer for said cellulose derivative, a ketonic acid having the formula, $$RCO-CR^1R^2CR^3R^4COOH$$

in which R, $R^1$, $R^2$, $R^3$, and $R^4$ represent a substituent taken from the group consisting of hydrogen, alkyl groups and aralkyl groups, said plasticizer being present in an amount sufficient to impart to structures produced from said composition a substantial degree of flexibility and pliability.

2. A cellulose acetate composition containing, as a plasticizer for said cellulose acetate, a ketonic acid having the formula, $$RCO—CR^1R^2CR^3R^4COOH$$

in which R, $R^1$, $R^2$, $R^3$, and $R^4$ represent a substituent taken from the group consisting of hydrogen, alkyl groups and aralkyl groups, said plasticizer being present in an amount sufficient to impart to structures produced from said composition a substantial degree of flexibility and pliability.

3. A composition composed of a cellulose derivative of an organic acid, said composition containing, as a plasticizer for said cellulose derivative, levulinic acid, said plasticizer being present in an amount sufficient to impart to structures produced from said composition a substantial degree of flexibility and pliability.

4. A composition composed of a cellulose derivative of an organic acid, said composition containing, as a plasticizer for said cellulose derivative, mesitonic acid, said plasticizer being present in an amount sufficient to impart to structures produced from said composition a substantial degree of flexibility and pliability.

5. A composition composed of a cellulose derivative of an organic acid, said composition containing, as a plasticizer for said cellulose derivative, beta-propio-propionic acid, said plasticizer being present in an amount sufficient to impart to structures produced from said composition a substantial degree of flexibility and pliability.

6. A cellulose acetate composition containing, as a plasticizer for said cellulose acetate, levulinic acid, said plasticizer being present in an amount sufficient to impart to structures produced from said composition a substantial degree of flexibility and pliability.

7. A cellulose acetate composition containing, as a plasticizer for said cellulose acetate, mesitonic acid, said plasticizer being present in an amount sufficient to impart to structures produced from said composition a substantial degree of flexibility and pliability.

8. A cellulose acetate composition containing, as a plasticizer for said cellulose acetate, beta-propio-propionic acid, said plasticizer being present in an amount sufficient to impart to structures produced from said composition a substantial degree of flexibility and pliability.

9. A flexible thread composed of a cellulose derivative of an organic acid, said thread containing, as a plasticizer therefor, a ketonic acid having the formula, $$RCO—CR^1R^2CR^3R^4COOH$$

in which R, $R^1$, $R^2$, $R^3$, and $R^4$ represent a substituent taken from the group consisting of hydrogen, alkyl groups and aralkyl groups, in sufficient amount to impart to said thread a substantial degree of flexibility and pliability.

10. A cellulose acetate thread containing, as a plasticizer therefor, a ketonic acid having the formula, $$RCO—CR^1R^2CR^3R^4COOH$$

in which R, $R^1$, $R^2$, $R^3$, and $R^4$ represent a substituent taken from the group consisting of hydrogen, alkyl groups and aralkyl groups, in sufficient amount to impart to said thread a substantial degree of flexibility and pliability.

11. A thread composed of a cellulose derivative of an organic acid, said thread containing, as a plasticizer therefor, levulinic acid, in sufficient amount to impart to said thread a substantial degree of flexibility and pliability.

12. A thread composed of a cellulose derivative of an organic acid, said thread containing, as a plasticizer therefor, mesitonic acid, in sufficient amount to impart to said thread a substantial degree of flexibility and pliability.

13. A thread composed of a cellulose derivative of an organic acid, said thread containing, as a plasticizer therefor, beta-propio-propionic acid, in sufficient amount to impart to said thread a substantial degree of flexibility and pliability.

14. A cellulose acetate thread containing, as a plasticizer therefor, levulinic acid, in sufficient amount to impart to said thread a substantial degree of flexibility and pliability.

15. A cellulose acetate thread containing, as a plasticizer therefor, mesitonic acid, in sufficient amount to impart to said thread a substantial degree of flexibility and pliability.

16. A cellulose acetate thread containing, as a plasticizer therefor, beta-propio-propionic acid, in sufficient amount to impart to said thread a substantial degree of flexibility and pliability.

GILMAN S. HOOPER.